(12) United States Patent
Kato

(10) Patent No.: US 12,069,398 B2
(45) Date of Patent: Aug. 20, 2024

(54) IMAGE PROCESSING APPARATUS, METHOD, AND NON-TRANSITORY COMPUTER-READABLE STORAGE MEDIUM FOR SUPERIMPOSING IMAGES

(71) Applicant: CANON KABUSHIKI KAISHA, Tokyo (JP)

(72) Inventor: Kensuke Kato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 17/943,286

(22) Filed: Sep. 13, 2022

(65) Prior Publication Data

US 2023/0116612 A1    Apr. 13, 2023

(30) Foreign Application Priority Data

Oct. 13, 2021 (JP) ................................. 2021-168273

(51) Int. Cl.
| | |
|---|---|
| *H04N 5/265* | (2006.01) |
| *G06T 7/70* | (2017.01) |
| *H04N 5/262* | (2006.01) |
| *H04N 7/18* | (2006.01) |
| *H04N 23/661* | (2023.01) |
| *H04N 23/695* | (2023.01) |

(52) U.S. Cl.
CPC .............. *H04N 5/265* (2013.01); *G06T 7/70* (2017.01); *H04N 5/2628* (2013.01); *H04N 7/183* (2013.01); *H04N 23/662* (2023.01); *H04N 23/695* (2023.01); *G06T 2207/10016* (2013.01); *G06T 2207/20212* (2013.01); *G06T 2207/30201* (2013.01)

(58) Field of Classification Search
CPC ...... H04N 5/265; H04N 5/2628; H04N 7/183; H04N 23/662; H04N 23/695; H04N 7/181; H04N 23/611; H04N 23/90; H04N 23/69; G06T 7/70; G06T 2207/10016; G06T 2207/20212; G06T 2207/30201
See application file for complete search history.

(56) References Cited

U.S. PATENT DOCUMENTS

2011/0249074 A1* 10/2011 Cranfill ................ H04N 5/2624
                                                              348/E7.083
2014/0232906 A1*  8/2014 Ha ........................ H04N 23/45
                                                              348/239

(Continued)

FOREIGN PATENT DOCUMENTS

| JP | 2019-057885 A | 4/2019 |
|---|---|---|
| JP | 2021-010053 A | 1/2021 |

*Primary Examiner* — Gevell V Selby
(74) *Attorney, Agent, or Firm* — Carter, DeLuca & Farrell LLP

(57) ABSTRACT

There is provided an image processing apparatus which comprises one or more memories storing instructions, and one or more processors executing the instructions to acquire information for identifying, based on a first image and a second image, a first object facing direction representing a direction in which a first object is facing in the first image, and a second object facing direction representing a direction in which a second object is facing in the second image; and to generate a combined image by superimposing at least a part of the first image including the first object on a position, in the second image, determined based on the acquired information.

14 Claims, 7 Drawing Sheets

(56) References Cited

U.S. PATENT DOCUMENTS

| | | | |
|---|---|---|---|
| 2015/0348301 A1* | 12/2015 | Yamada | H04N 23/611 348/239 |
| 2017/0150122 A1* | 5/2017 | Cole | H04N 13/271 |
| 2021/0067738 A1* | 3/2021 | Leppanen | H04N 23/90 |

* cited by examiner

|  | OBJECT 1 | OBJECT 2 | ... |
|---|---|---|---|
| OBJECT ID | 123 | 124 |  |
| TYPE OF OBJECT | PERSON | PERSON |  |
| STATE OF OBJECT | STANDING, SPEAKING | SITTING, SILENT |  |
| POSITION-AND-SIZE OF OBJECT | (100, 520) 240x560 | (380, 740) 250x250 |  |
| POSITION-AND-SIZE OF REGION OF INTEREST | (100, 520) 240x240 | (380, 740) 250x250 |  |
| DIRECTION OF OBJECT | −45 DEGREES | −30 DEGREES |  |
| OBJECT'S EYE POSITION | (280, 640) | (500, 860) |  |

|  | MAIN VIDEO | SUB-VIDEO |
|---|---|---|
| CROPPING POSITION-AND-SIZE | (0, 0)1920x1080 | (630, 160) 600x600 |
| SUPERIMPOSING POSITION-AND-SIZE | — | (20, 20) 400x400 |
| SUPERIMPOSING SHAPE | — | RECTANGULAR |
| MIRROR-REVERSE FLAG | — | OFF |

IMAGE PROCESSING APPARATUS, METHOD, AND NON-TRANSITORY COMPUTER-READABLE STORAGE MEDIUM FOR SUPERIMPOSING IMAGES

BACKGROUND

Field

The present disclosure relates to a technique of superimposing two videos.

Description of the Related Art

There is known a Picture-in-Picture technique that displays a video shot by a sub-camera as a wipe video in a manner superimposed on a video captured by a main camera. The literature Japanese Patent Laid-Open No, 2021-10053 discloses a technique for determining a shooting direction of the main camera according to the position and the size of a wipe video so that the wipe video is combined in a preferred composition.

However, the aforementioned literature does not determine the final output video in accordance with the object. Therefore, the technique proposed in the aforementioned literature may cause a positional relation between each object and the wipe to be unnatural. In addition, simply superimposing the wipe video according to the technique proposed in the aforementioned literature may generate a low-quality video, such that object size is small and visibility is low.

SUMMARY

According to an aspect of this discloser, there is provided an image processing apparatus comprising: one or more memories storing instructions and one or more processors executing the instructions to: acquire information for identifying, based on a first image and a second image, a first object facing direction representing a direction in which a first object is facing in the first image, and a second object facing direction representing a direction in which a second object is facing in the second image; and generate a combined image by superimposing at least a part of the first image including the first object on a position, in the second image, determined based on the acquired information, the position on which the at least the part of the first image is superimposed being set based on the first object facing direction in the first image if the second object in the second image is not selected.

According to the present disclosure, it is possible to generate a combined video in which the positional relation between respective objects in two videos appears natural with little sense of incongruity.

Further features of the disclosure will become apparent from the following description of exemplary embodiments with reference to the attached drawings.

DESCRIPTION OF THE EMBODIMENTS

Figure 1A:
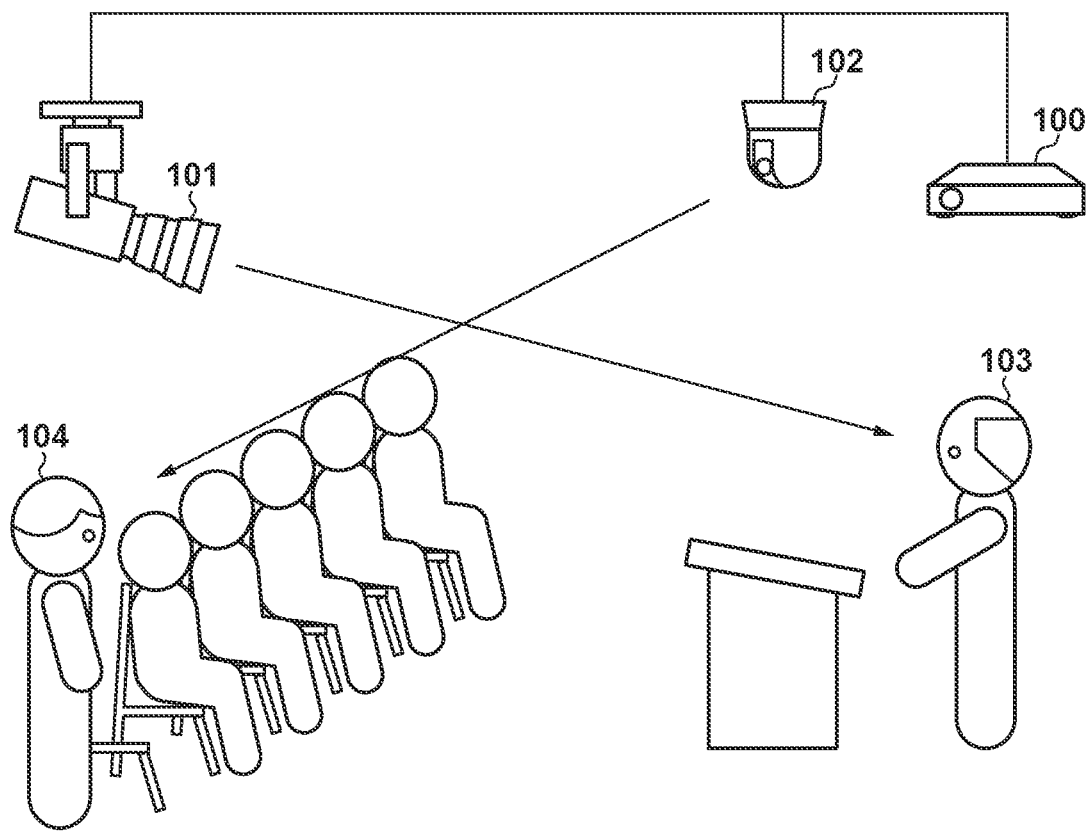
FIGS. 1A and 1B illustrate a video processing system and an example of an output video according to an embodiment.

Hereinafter, embodiments will be described in detail with reference to the attached drawings. Note, the following embodiments are not intended to limit the scope of the present disclosure. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 1B:
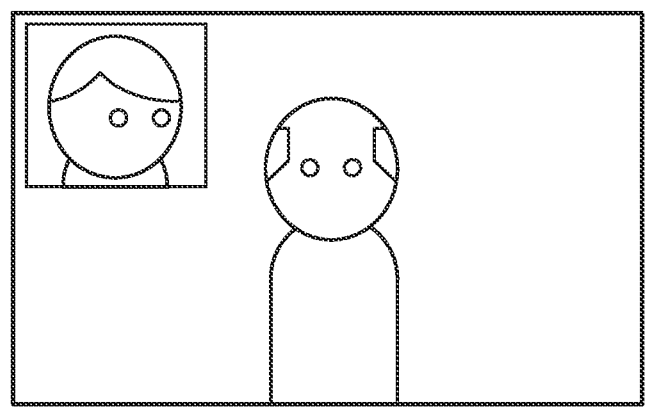

FIG. 1A illustrates a configuration of a video system according to an embodiment, and FIG. 1B illustrates an example of an output video. A control apparatus 100 in the video system transmits a control command related to various shooting conditions to a main camera 101 and a sub-camera 102, and also receives video data captured by the cameras. The main camera 101 shoots a main object 103, and transmits a video acquired by the shooting to the control apparatus 100 as a main video. The sub-camera 102 shoots a sub-object 104, and transmits a video acquired by the shooting to the control apparatus 100 as a sub-video. The control apparatus 100 performs video processing that superimposes, in real time, a portion of the sub-video on the main video as a wipe screen to generate an output video (combined video as illustrated in FIG. 1B).

The main camera 101 and the sub-camera 102 in the embodiment are distinguished solely by their role in the video system, and there is no difference in terms of hardware as a camera. In the following, although description will be provided only for the main camera 101 for simplicity, it should be understood that the same goes for the sub-camera 102.

Figure 7:
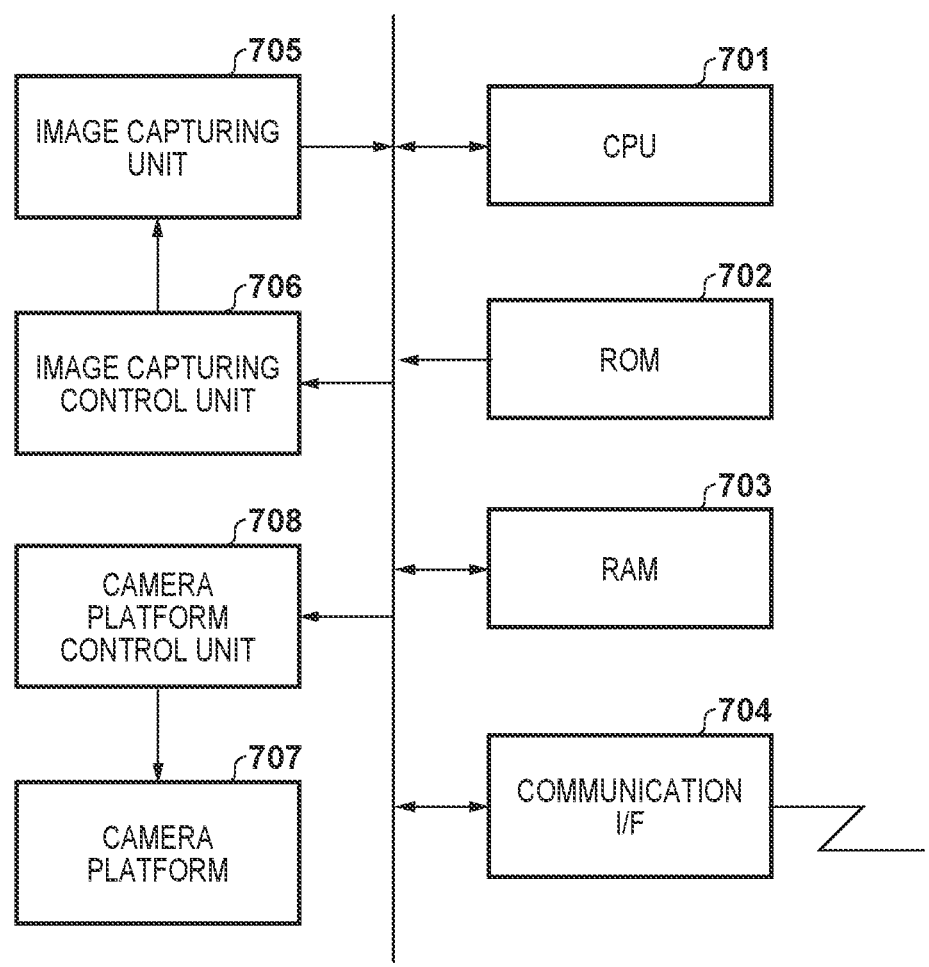
FIG. 7 is a block configuration diagram of a main camera in an embodiment.

FIG. 7 illustrates a hardware configuration diagram of the main camera 101 in the embodiment. The main camera 101 can be remotely controlled by the control apparatus 100. For this purpose, the main camera 101 includes a CPU 701, a ROM 702, a RAM 703, a communication 704, an image capturing unit 705, an image capturing control unit 706, a camera platform 707, and a camera platform control unit 708.

Using the RAM 703 as a work area, the CPU 701 controls the entire apparatus according to a program stored in the ROM 702. The communication I& 704 communicates with the control apparatus 100 under the control by the CPU 701. The image capturing unit 705 includes an optical lens (including a focusing lens and a zoom lens), a diaphragm, and an image capturing element. The image capturing control unit 706 controls the focus lens, the zoom lens, and the diaphragm under the control by the CPU 701. The camera platform control unit 708 drives a pan motor and/or a tilt motor of the camera platform 707 under the control by the CPU 701.

Figure 2:
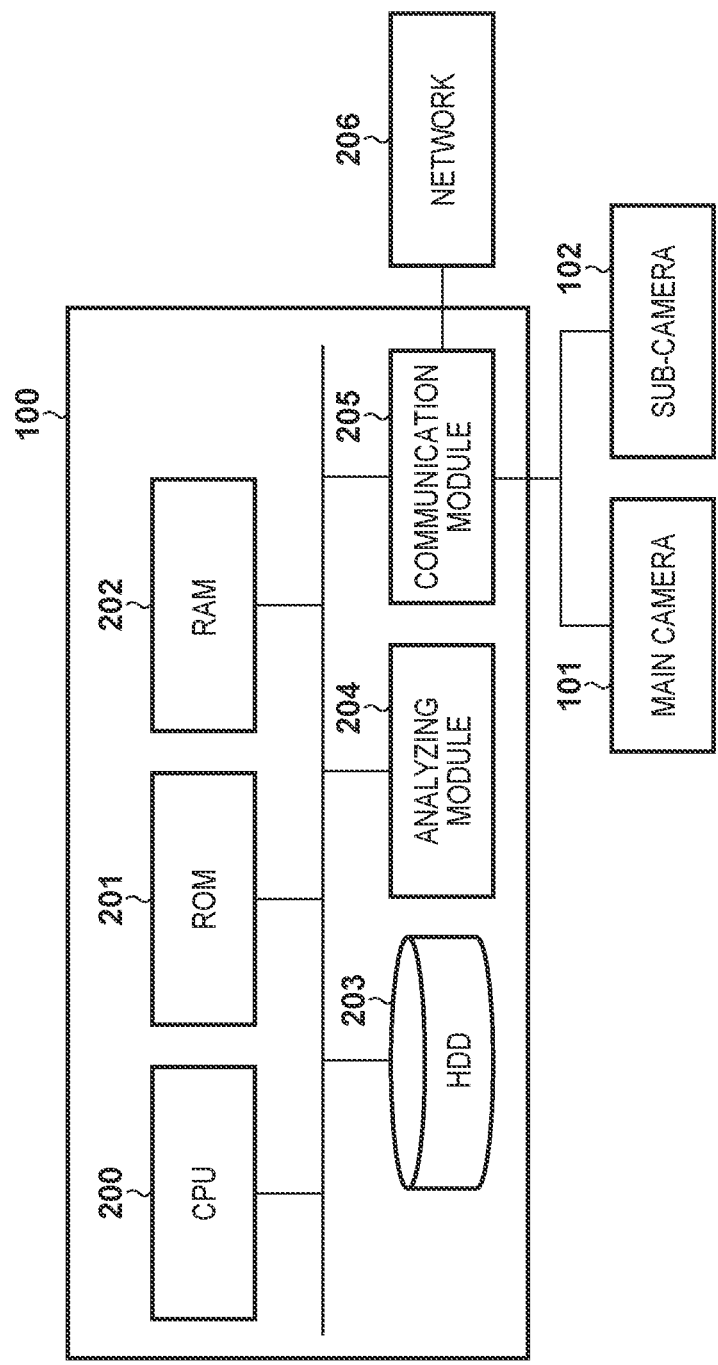
FIG. 2 illustrates an example of a configuration of a control apparatus according to an embodiment.

With such a configuration, the CPU 701 controls the image capturing unit 705 to perform image capturing at a predetermined frame rate (e.g., 30 frames/second) and transmit the acquired video data to the control apparatus 100 via the communication I/F 704. In addition, upon receiving a control command (control information described below) from the control apparatus 100 via the communication I/F 704 and the control command is related to zoom control, the CPU 701 controls the image capturing control unit 706 to move the zoom lens to a position (focal length) in accordance with the command. When the control command is related to pan or tilt control, the CPU 701 controls a motor (not illustrated) in the camera platform control unit 708 so as to control rotation of the camera platform to the target pan position or tilt position. In either case, upon completion of the drive in accordance with the command, the CPU 701 transmits a response indicating completion of the drive to the control apparatus 100 via the communication I/F 704. The configuration and operation of the main camera 101 are as described above. As has been explained above, the configuration and operation of the sub-camera 102 are similar to those of the main camera 101, FIG. 2 illustrates a hardware configuration mainly of the control apparatus 100. The control apparatus 100 includes a CPU 200, a ROM 201, a, RAM 202, an HDD 203, an analyzing module 204, and a communication module 205.

The CPU 200 executes a program stored in the ROM 201 or a program loaded to the RAM 202 from the HDD 203 to control each component of the control apparatus 100.

The analyzing module 204 analyzes object information in the main video and the sub-video under the control by the CPU 200. The analysis process may perform analysis by a GPU (not illustrated), or by a dedicated video analysis circuit (not illustrated) such as an ASIC or an FPGA. Here, it is assumed that the administrator sets which of the two cameras is to be used as the main camera or the sub-camera.

The communication module 205 communicates with a network 206, the main camera 101, and the sub-camera 102 that are external to the apparatus under the control by the CPU 200. Specifically, the communication module 205 transmits various control commands to the main camera 101 and the sub-camera 102, and receives video data from the main camera 101 and the sub-camera 102. In addition, the communication module 205 transmits an output video generated by the control apparatus 100 to an apparatus connected to the network 206 (e.g., a video distribution server, or a client terminal for viewing the video). Here, the communication path used by the communication module 205 may be either wired or wireless.

Figure 3:
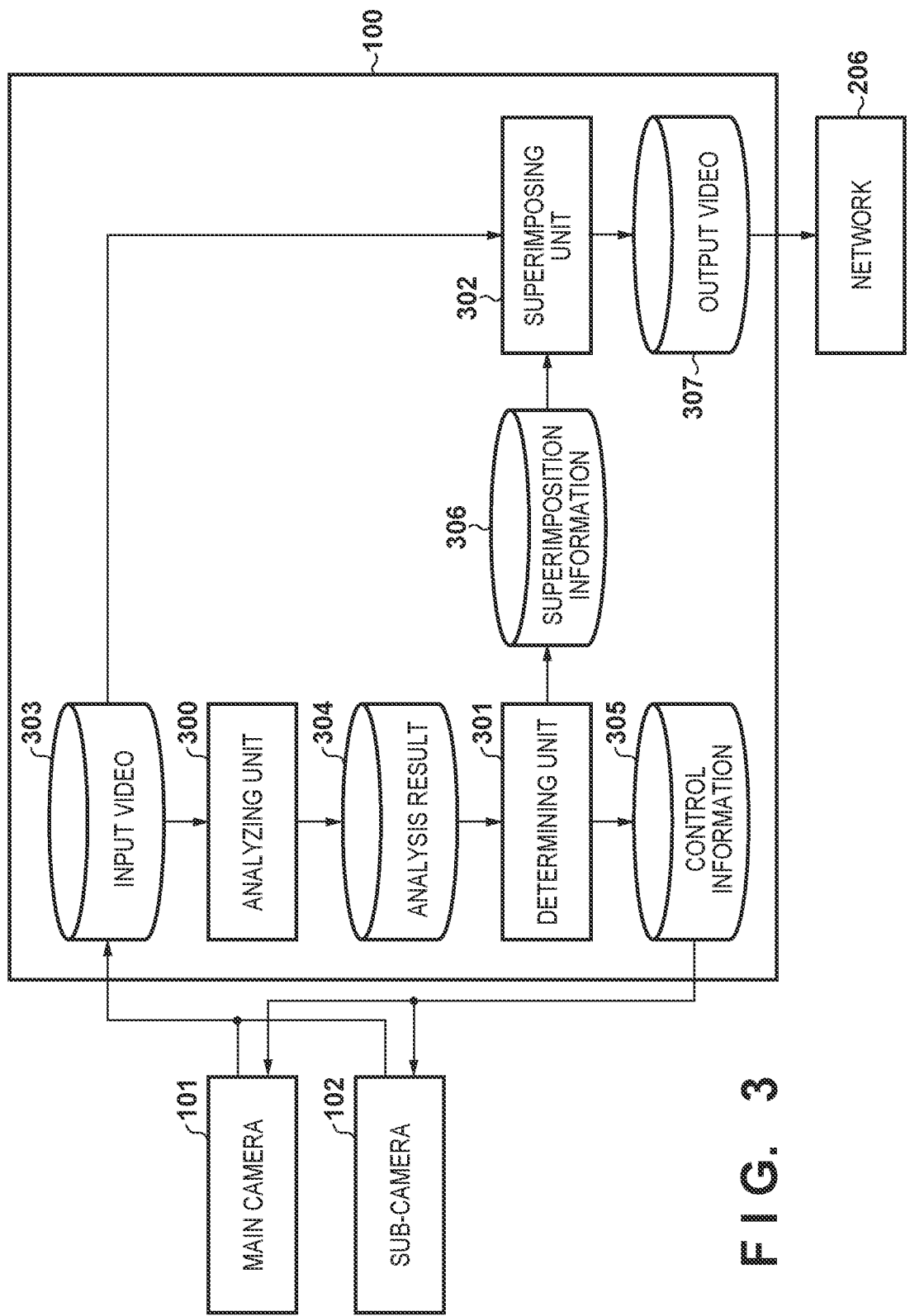
FIG. 3 illustrates an example of a logical configuration of the control apparatus according to an embodiment.

The HDD 203 stores not only programs to be executed by the CPU 200 but also a database for identifying an object (person or the like) described below, the database including an object ID and characteristic information specific to the person, FIG. 3 illustrates a functional configuration diagram of the control apparatus 100. Although an analyzing unit 300, a determining unit 301, and a superimposing unit 302 included in the control apparatus 100 function by the CPU 200 executing a corresponding program, they may be implemented by a circuit or the like independent of the CPU 200.

The analyzing unit 300 acquires an input video 303 from the main camera 101 and the sub-camera 102 via the communication module 205. Referring to the DB or the like preliminarily stored in the HDD 203, the analyzing unit 300 analyzes the input video 303 using the analyzing module 204, and supplies an analysis result 304 to the determining unit 301. Specific parameters included in the analysis result 304 will be described below. Even when the object is lost, the analyzing unit 300 supplies for a while the determining unit 301 with the same analysis result 304 as that before the object was lost, in order to prevent flicker in the wipe being displayed.

Based on the analysis result 304, the determining unit 301 determines a final output video including the wipe in accordance with the objects in the wipe video and the main video. The determining unit 301 generates control information 305 for changing the composition of the main camera 101 and the sub-camera 102, and supplies the control information 305 to the main camera 101 and the sub-camera 102 using the communication module 205. The control information 305 is provided in a control command format including parameters related to the shooting such as the control amount of pan, tilt and zoom. The determining unit 301 generates, and supplies to the superimposing unit 302, superimposition information 306 for superimposing the sub-video over the main video. Specific parameters of the superimposition information 306 will be described below.

The superimposing unit 302 generates an output video 307 based on the input video 303 and the superimposition information 306. The output video 307 is output to the network 206 by the communication module. The output video 307 may be output to the HDD 203.

Figures 4A, 4B:
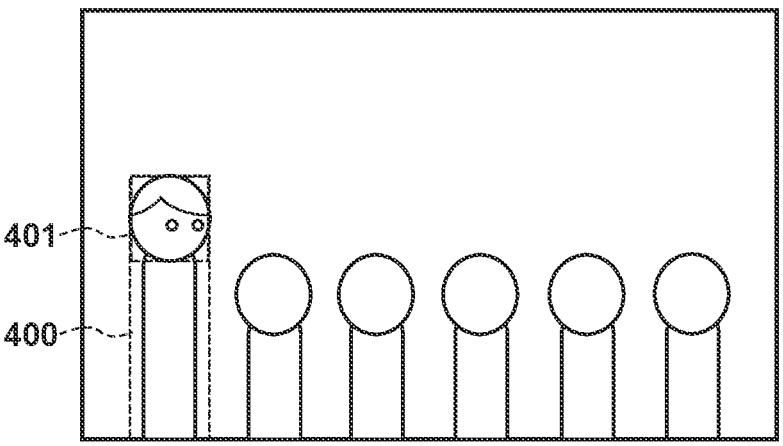
FIGS. 4A and 4B illustrate an example of an input video and an analysis result according to an embodiment.

FIG. 4A illustrates an example of the input video, and FIG. 4B illustrates an example of the analysis result provided by the analyzing unit 300. The video illustrated in FIG. 4A includes a position-and-size 400 of the object and a position-and-size 401 of a region of interest (face).

An object ID in FIG. 4B is an ID for identifying the detected object. The type of the object is a type of a detected object such as "person", "animal", "vehicle", "article", "preliminarily registered personnel", "text written on a blackboard", or the like. When the type of the object is "person", the state of the object may be "standing", "speaking", "sitting", "silent" or the like. The position-and-size is expressed in units of pixel, with the upper left corner of the input video being the origin. Specifically, the position-and-size of the object is the upper-left coordinates and the size of a region indicating the entire object (enclosing rectangle), an object 1 corresponds to the position-and-size 400 of the object. The position-and-size of the region of interest is the upper-left coordinates and the size of the enclosing rectangle of a region generally interested such as the face of the object, and the object 1 corresponds to the position-and-size dimension 401 of the region of interest. When focusing on the entire object, the position-and-size of the region of interest may be identical to the position-and-size of the object. In the embodiment, a direction in which an object is facing is defined as an object facing direction. The object facing direction is defined as an angle relative to a standard direction in which the object is facing frontward. The object's eye position is defined as coordinates of the center position of both eyes of the object.

Figures 5A, 5B:
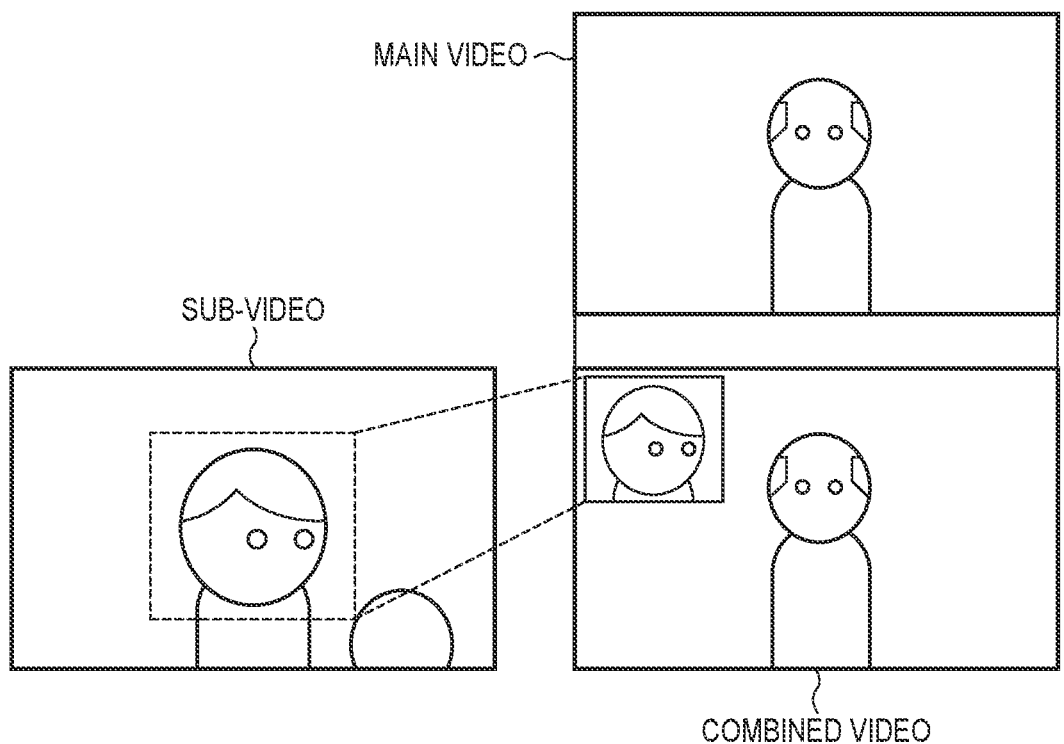
FIGS. 5A and 5B illustrate an example of the superimposition information and an example of a video before and after superimposition according to an embodiment.

FIG. 5A illustrates an example of the superimposition information 306 and FIG. 5B illustrates an example of a video before and after superimposing.

A "cropping position-and-size" in the list illustrated in FIG. 5A corresponds to the coordinates of the upper left corner of the region of interest and its size, in the case of a main video, in addition, the "cropping position-and-size" in the sub-video corresponds to the coordinates of the upper left corner of the region to be cut out for the wipe and its size. Here, the coordinates and the size are expressed in units of pixel. "Superimposing position-and-size" refers to the position and the size of a region in the main video. "Superimposing shape" refers to a shape of the region of interest to be cut out from the sub-video, for which a rectangular, circular, trapezoidal, rhomboidal shape or the like can be used in the embodiment. "Mirror-reverse flag" is a flag indicating whether or not to superimpose the sub-video in a mirror-reversed manner.

The example illustrated in FIG. 5A indicates that, with the coordinates (630, 160) in the sub-video set to be the upper left corner, a rectangular region of size of 400 pixels in horizontal direction and 400 pixels in vertical direction is cropped as a wipe, and the upper left corner of the cropped wipe video is positioned at the coordinates (20, 20) of the main video. FIG. 5B illustrates how a combined video is generated from the main video and the sub-video by the superimposition information 306 illustrated in FIG. 5A.

Figure 6:
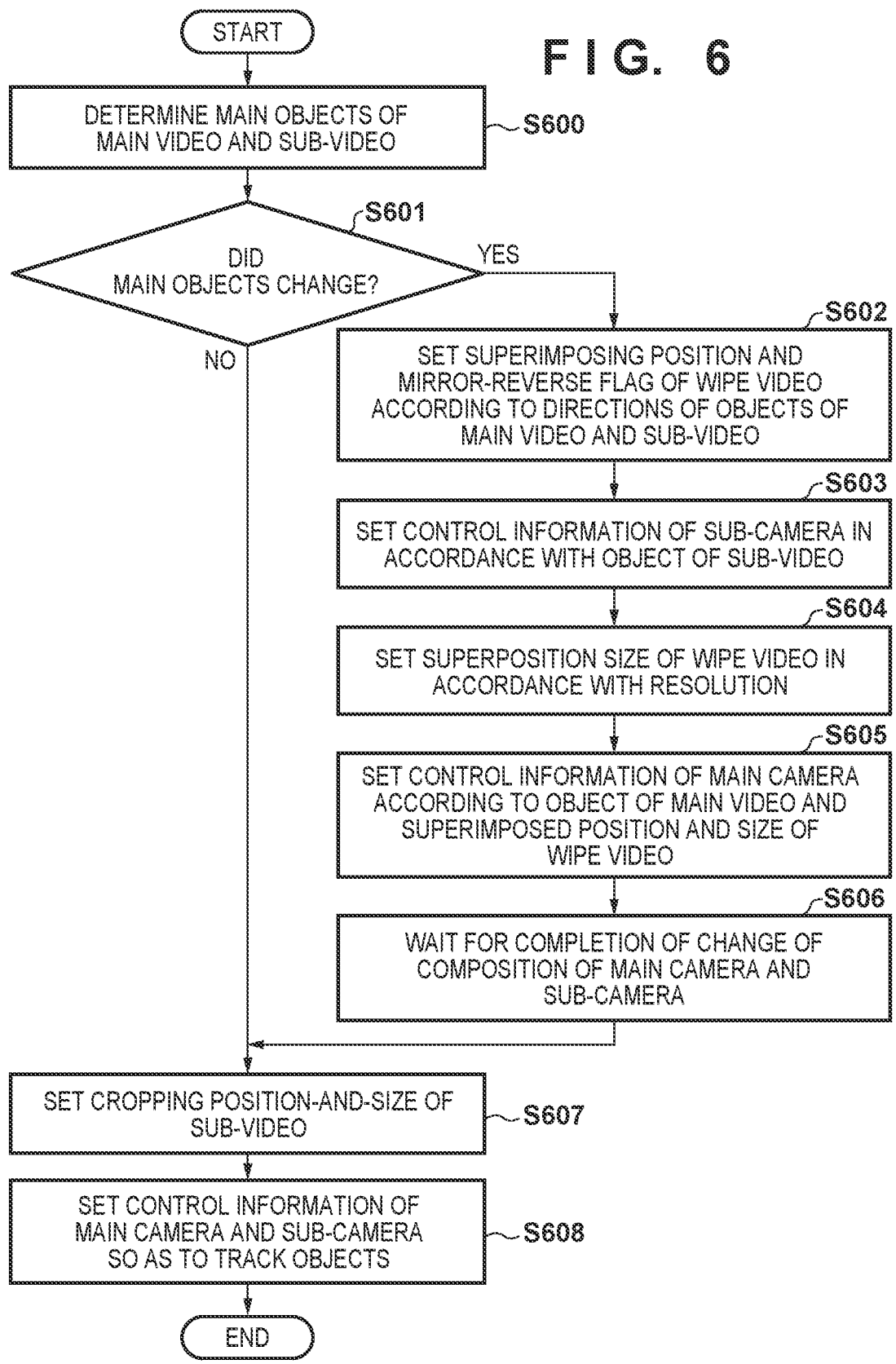
FIG. 6 is a flowchart illustrating an example of processing by a determining unit according to an embodiment.

The flowchart illustrated in FIG. 6 represents a series of processing executed by the determining unit 301. The determining unit 301 performs the process of the flowchart illustrated in FIG. 6 at a timing when the analysis by the analyzing unit 300 is completed, or at a regular timing.

At step S600, the determining unit 301 determines the main object to be tracked in the main video and the sub-video, respectively, based on the analysis result 304. The determining unit 301 continuously selects, as a main object, the object which has been selected as the main object in the immediately preceding processing result, based on the object D. Furthermore, the determining unit 301 preliminarily registers the type and the state of the object to be prioritized and, when the type of the object matches "person", "preliminarily registered person", or "text written on a blackboard" and the state of the object matches "standing" or "speaking", selects the registered object as the main object. Upon determining that the object is not included in the analysis result 304, or when tracking is preliminarily registered to be turned off, the determining unit 301 does not select the main object.

At step S601, the determining unit 301 determines whether or not there is a change in the object ID of the main object or a change in selection of the main object being selected or not selected, in either the main video or the sub-video. Upon determining that there is a change, the determining unit 301 advances the process to step S602, or to step S607 upon determining that there is no change.

At step S602, the determining unit 301 sets a superimposing position of the wipe video so that the respective main objects in the main video and the sub-video face each other as much as possible in the final video. When, for example, the main object in the main video is facing left in a video, the determining unit 301 sets a preliminarily set close-to left position in the main video to the superimposing position of the wipe video. When the main object in the main video is facing right in a video, the determining unit 301 sets a preliminarily set close-to-right position in the main video to the superimposing position of the wipe video.

In addition, when the main object facing direction in the main video is neither left nor right (corresponding to the case of facing almost front) and the main object facing direction in the sub-video is left in the video, the determining unit 301 sets the preliminarily set close-to-right position in the main video to the superimposing position of the wipe video.

In addition, when the main object facing direction in the main video cannot be determined to be either left or right (corresponding to the case of facing almost front), and the main object facing direction in the sub-video is right in the video, the determining unit 301 sets the preliminarily set close-to left position in the main video to the superimposing position of the wipe video.

Additionally, when the main object facing directions in the main video and the sub-video are neither left nor right, the determining unit 301 sets the superimposing position of the wipe video to a preliminarily set position registered as a default position. Alternatively, the superimposing positions of the wipe videos may be maintained at a previous position.

Furthermore, when the main object is not selected in the main video, the superimposing position of the wipe video is set in accordance with the main object facing direction in the sub-video. Additionally, when the main object is not selected in the sub-video, the superimposing position of the sub-video is set in accordance with the main object facing direction in the main video.

Still furthermore, the main objects in the main video and the sub-video are both facing the identical direction (both facing left or right), only setting the superimposing position of the wipe video does not make the main objects facing each other as much as possible in the final video. Therefore, the determining unit 301 turns ON the mirror-reverse flag of the sub-video. As a result, the main objects in the main video and the sub-video are allowed to be in a relation facing each other.

The position in the vertical direction at which the wipe video is to be superimposed is a preliminarily registered position in accordance with the situation. Alternatively, the height of the superimposing position of the wipe video may be set so that the heights of the eyes of the main objects in the main video and the sub-video match.

The coordinates at which the wipe video is superimposed is assumed to be a position separated from the screen edge by 20 pixels, for example, based on the positions of the four corners of a rectangle determined at step S602.

At step S603, the determining unit 301 sets respective values of pan, tilt and zoom of the sub-camera 102, in accordance with the information indicated by the analysis result 304 with regard to the main object in the sub-video. Within a movable range of pan and tilt, the determining unit 301 calculates the values of, and generates a command for, pan and tilt required for positioning the main object or a region of interest at the center position in the video. It is assumed that which of the main object and the region of interest is to be positioned at the center of the screen depends on preliminarily registered setting information, in accordance with the situation. The value of zoom is set to a value that prevents reduction of the resolution of the wipe video, and allows for shooting as wide a range as possible. Shooting a wide range makes it easier to detect and follow a new main object by changing the cropping position without panning or tilting even when the region of interest of the main object moves more or less. The determining unit 301 preliminarily determines a size of the main object after cropping according to its type, and a proportion of an extra region around the region of interest of the main object. Taking the subject's face as an example, the determining unit 301 preliminarily registers the size of the face after cropping to be 400×400 pixels and the proportion of the extra region to be 20%, and determines the value of zoom making the detected size of the face to be 320×320 pixels. Alternatively, the value of zoom may be determined making a resolution in scaling up or down the video at cropping not to be reduced as much as possible, and further, to obtain 480×480 pixels which having been multiplied by 150%, for example.

The determining unit 301 may automatically calculate the size after cropping from the size of the main object after a preliminarily registered zooming 1w the main camera and the proportion of the extra region so that the main object in the main video and the main object in the sub-video come to be in a same size after superimposition. When, for example, the size of the main object after zooming of the main camera is 350×350 pixels and the proportion of the extra region is 20%, the size after cropping is 420×420 pixels. In addition, the determining unit 301 sets the value of zoom to a preliminarily registered wide angle of view so that the object can be found when the object is not in the sub-video.

At step S604, the determining unit 301 sets the size of the wipe video to be displayed in a superimposed manner. The basic superimposing size, which is the size after cropping in accordance with the type of the main object, is 400×400 pixels, for example. However, the superimposing size of the wipe video is reduced when a size of the main object in the sub-video is small even with zooming to the maximum extent, and an excessively enlarged display reduces its resolution. The determining unit 301 calculates the size of the main object in the sub-video after the change of composition, and sets the smaller one of the basic superimposing size and the calculated main object size as the superimposing size of the wipe video. When, for example, the size after cropping is at most 150×150 pixels, the superimposing size of the wipe video is also set to 150×150 pixels. Alternatively, when allowing the size to be stretched up to double size, the superimposing size of the wipe video may be set as 300×300 pixels, for example. Here, the allowable size may be set by the user.

At step S605, the determining unit 301 sets respective values of pan, tilt and zoom of the main camera 101 according to the main object in the main video and the position-and-size of the superimposition of the wipe video. Specifically, the determining unit 301 calculates and sets the values of pan and tilt so that either the main object or the region of interest is positioned at the centered of the screen within the movable range of pan and tilt.

It is assumed that which of the main object and the region of interest is to be positioned at the center of the screen is preliminarily registered in accordance with the situation and determined by the user selecting one of them at the shooting. Upon newly finding a main object in a main video, the determining unit 301 calculates the value of zoom so that the main object size after zooming matches the preliminarily registered size. Furthermore, when the main object is selected in the sub-video, the determining unit 301 sets the value of zoom to a zoomed-out value so that the face and the wipe video are less likely to overlap. For example, the determining unit 301 calculates a value of zoom so as to change from the angle of view before zoom out to an angle of view after zoom out covering a region extended by half the superimposing size of the wipe video.

The determining unit 301 may shift the value of tilt in case of previously registered condition. When, for example, the main object is a standing person and superimposing position of the wipe video is at the top of the screen, the determining unit 301 sets the value of tilt in a looking down direction so that the object's face and the wipe video become less likely to overlap.

The determining unit 301 may change the proportion of the extra region so that the size of the main object in the main video after zoom matches the main object in the sub-video after the zoom.

The determining unit 301 sets the value of zoom to a preliminarily registered wide angle of view so that the object can be found when the object is not in the main video.

The main camera 101 and the sub-camera 102 start driving the drive unit related to pan, tilt, and zoom, based on the control information (command specifying pan, tilt or zoom) which has been set in the determining unit 301.

At step S606, the determining unit 301 waits for completion of the drive of pan, tilt and zoom being performed by the main camera 101 and the sub-camera 102.

At step S607, the determining unit 301 sets the cropping position-and-size of the sub-video. The cropping position of the sub-video is set to the position of the region of interest of the object. The size of cropping the sub-video is set to a value calculated by multiplying the size of the main object by the proportion of the extra region and adding the product to the size of the main object.

When no main object is selected in the sub-video, the determining unit 301 does not superimpose the wipe video by skipping the setting of the cropping position-and-size of the sub-video.

The determining unit 301 may set the cropping position-and-size of the main video. The cropping position is set to the position of the main object. The size of cropping is set by calculating the value of zoom so that the object size matches the object size after zoom calculated at step S605.

At step S608, the determining unit 301 sets the control information of the main camera 101 and the sub-camera 102 so as to track the main object when the main object has moved from the center of the screen by a certain distance or more. For example, the determining unit 301 calculates the values of pan and tilt similarly to step S603 or step S605 when the center position of the main object is located in left 25% region, right 25% region, top 25% region, or bottom 25% region of the video. Furthermore, when the size of the main object exceeds 150% or falls below 75% of the detected size of the face set at step S603, step S605 or step S608, for example, the determining unit 301 calculates the value of zoom similarly to step S603 or step S605.

Although processing of the sub-video is performed first in the flow illustrated in FIG. 6, processing of the sub-video may be performed after the main video has been processed.

According to the first embodiment, it is possible to generate a video in which the positional relation between each object and the wipe appears natural and sense of incongruity is less likely to be generated. In addition, it is also possible to generate a highly visible, high-quality video having an appropriate object size.

Second Embodiment

One or both of the main video and the sub-video may be tracking-unnecessary information, instead of a live video shot by a camera, such as a video preliminarily shot and recorded, a presentation screen, a game screen, a still image, a text or the like.

The analyzing unit 300 does not analyze the tracking-unnecessary information and notifies an empty analysis result of the determining unit 301. When the sub-video is tracking-unnecessary information, the determining unit 301 does not set the control information of the sub-camera at step S603. Furthermore, at step S604, the superimposing size of the wipe video is set to a preliminarily registered default size or the size of the sub-video. Furthermore, at step S607, the cropping position-and-size of the sub-video is set as that of the entire wipe video.

When the main video is tracking-unnecessary information, the determining unit 301 does not set the control information of the main camera at step S605. Furthermore, at step S607, the cropping position-and-size of the main video is set as that of the entire output video.

As such, the second embodiment allows for controlling with either the main video or the sub-video being replaced by tracking-unnecessary information.

Although the control apparatus 100 performs analysis, determination, and superimposing in the first and the second embodiments described above, they may be performed by the main camera 101 or the sub-camera 102.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-168273, filed Oct. 13, 2021, which is hereby incorporated by reference herein in its entirety.

What is claimed is:

1. An image processing apparatus comprising:
one or more memories storing instructions; and
one or more processors executing the instructions to:
acquire information for identifying, based on a first image and a second image, a first object facing direction representing a direction in which a first object is facing in the first image, and a second object facing direction representing a direction in which a second object is facing in the second image; and
generate a combined image by superimposing at least a part of the first image including the first object on a position, in the second image, determined based on the acquired information, the position on which the at least the part of the first image is superimposed being set based on the first object facing direction in the first image if the second object in the second image is not selected; and
communicate with an image capturing apparatus that is an external apparatus and can be remotely controlled,
wherein one of the first and the second images is an image received from the image capturing apparatus, and the other of the first and the second images is a previously recorded image.

2. The apparatus according to claim 1, wherein the one or more processors execute the instruction to analyze the first image and the second image and the acquired information including a first object in the first image and a second object facing direction in the second image,
wherein the one or more processors executes the instructions to determine a position at which a part of the first object is superimposed in the second image, based on the information representing the second object facing direction, and generate the combined image.

3. The apparatus according to claim 1, further comprising a communication interface of communicating with two image capturing apparatuses that can be remotely controlled and configured to capture the first and the second images.

4. The apparatus according to claim 1, wherein the one or more processors further execute to generate, based on the acquired information, control information related to an angle of view for the image capturing apparatus, and transmit the generated control information.

5. The apparatus according to claim 1, wherein the one or more processors further execute the instruction to generate control information related to pan, tilt and zoom to follow the object's movement or realize a preliminarily set composition.

6. The apparatus according to claim 1, wherein when the first and the second object facing directions are different, the one or more processors execute the instruction to generate a combined image by superimposing at least a part of the first image including the first object, on a preliminarily set position at a side to which the second object is facing in the second image.

7. The apparatus according to claim 1, wherein the first and the second objects are persons, and
wherein the one or more processors execute the instructions to generate a combined image so that a position of the second object's eye in a vertical direction matches a position of the first object's eye.

8. The apparatus according to claim 1, wherein the one or more processors further execute the instructions to transmit a generated combined image generated to a network.

9. The apparatus according to claim 1, wherein the one or more processors further execute the instructions to set the position, on which the at least the part of the first image is superimposed, based on the second object facing direction in the second image if the first object in the first image is not selected.

10. An image processing apparatus comprising:
one or more memories storing instructions; and
one or more processors executing the instructions to:
acquire information for identifying, based on a first image and a second image, a first object facing direction representing a direction in which a first object is facing in the first image, and a second object facing direction representing a direction in which a second object is facing in the second image; and
generate a combined image by superimposing at least a part of the first image including the first object on a position, in the second image, determined based on the acquired information, the position on which the at least the part of the first image is superimposed being set based on the first object facing direction in the first image if the second object in the second image is not selected, wherein, in a case where the first and the second object facing directions are identical, the one or more processors execute the instruction to generate a combined image by superimposing an image acquired by mirror-reversing at least a part of the first image including the first object, on a preliminarily set position at a side to which the second object is facing in the second image.

11. A method of controlling an image processing apparatus, comprising:

acquiring information for identifying, based on a first image and a second image, a first object facing direction representing a direction in which a first object is facing in the first image, and a second object facing direction representing a direction in which a second object is facing in the second image;

generating a combined image by superimposing at least a part of the first image including the first object on a position, in the second image, determined based on information acquired in the acquiring, the position on which the at least the part of the first image is superimposed being set based on the first object facing direction in the first image if the second object in the second image is not selected; and communicating with an image capturing apparatus that is an external apparatus and can be remotely controlled, wherein one of the first and the second images is an image received from the image capturing apparatus, and the other of the first and the second images is a previously recorded image.

12. A non-transitory computer-readable storage medium storing instructions which, when read and executed by a computer, causes the computer to execute the steps of a method of controlling an image processing apparatus, the method comprising:

acquiring information for identifying, based on a first image and a second image, a first object facing direction representing a direction in which a first object is facing in the first image, and a second object facing direction representing a direction in which a second object is facing in the second image;

generating a combined image by superimposing at least a part of the first image including the first object on a position, in the second image, determined based on information acquired in the acquiring, the position on which the at least the part of the first image is superimposed being set based on the first object facing direction in the first image if the second object in the second image is not selected; and communicating with an image capturing apparatus that is an external apparatus and can be remotely controlled, wherein one of the first and the second images is an image received from the image capturing apparatus, and the other of the first and the second images is a previously recorded image.

13. A method of controlling an image processing apparatus, comprising:

acquiring information for identifying, based on a first image and a second image, a first object facing direction representing a direction in which a first object is facing in the first image, and a second object facing direction representing a direction in which a second object is facing in the second image;

generating a combined image by superimposing at least a part of the first image including the first object on a position, in the second image, determined based on information acquired in the acquiring, the position on which the at least the part of the first image is superimposed being set based on the first object facing direction in the first image if the second object in the second image is not selected; and in a case where the first and the second object facing directions are identical, generating a combined image by superimposing an image acquired by mirror-reversing at least a part of the first image including the first object, on a preliminarily set position at a side to which the second object is facing in the second image.

14. A non-transitory computer-readable storage medium storing instructions which, when read and executed by a computer, causes the computer to execute the steps of a method of controlling an image processing apparatus, the method comprising:

acquiring information for identifying, based on a first image and a second image, a first object facing direction representing a direction in which a first object is facing in the first image, and a second object facing direction representing a direction in which a second object is facing in the second image;

generating a combined image by superimposing at least a part of the first image including the first object on a position, in the second image, determined based on information acquired in the acquiring, the position on which the at least the part of the first image is superimposed being set based on the first object facing direction in the first image if the second object in the second image is not selected; and in a case where the first and the second object facing directions are identical, generating a combined image by superimposing an image acquired by mirror-reversing at least a part of the first image including the first object, on a preliminarily set position at a side to which the second object is facing in the second image.

* * * * *